United States Patent
Takano

[11] 3,918,798
[45] Nov. 11, 1975

[54] ZOOM LENS HAVING TWO DIAPHRAGMS
[75] Inventor: Eiichi Takano, Tokyo, Japan
[73] Assignee: Canon Kabushiki Kaisha, Japan
[22] Filed: Feb. 11, 1974
[21] Appl. No.: 441,657

[30] Foreign Application Priority Data
Feb. 13, 1973 Japan.............................. 48-17701

[52] U.S. Cl. ................. 350/186; 350/207; 354/196
[51] Int. Cl.²......................................... G02B 15/16
[58] Field of Search ........... 350/184, 186, 187, 207; 354/196

[56] References Cited
UNITED STATES PATENTS
| | | | |
|---|---|---|---|
| 2,663,223 | 12/1953 | Hopkins............................. | 350/184 |
| 2,741,155 | 4/1956 | Hopkins............................. | 350/184 |
| 3,433,559 | 3/1969 | Vockenhuber et al. ......... | 350/184 X |

Primary Examiner—John K. Corbin
Attorney, Agent, or Firm—McGlew and Tuttle

[57] ABSTRACT

A zoom lens comprises a focusing lens which does not move during zooming, a variator lens which moves along an optical axis in connection with a zooming operation for magnification variation, a compensator which moves in the direction of the optical axis in connection with movement of the variator lens, a first diaphragm member to determine the F-number of the zoom lens, a relay lens, and a second diaphragm member which moves along the optical axis and is positioned behind the above-mentioned variator lens. This second diaphragm member moves in the same direction along the optical axis as, and with a predetermined relationship with the movement of the variator lens. When the variator lens is moved from the compensator lens side toward the focusing lens side (from the telescopic side to the wide side), the second diaphragm member will effect vignetting of the light flux reaching the central part of picture frame so that the vignetting - image height characteristics become almost equal. However, no vignetting is effected on the light flux reaching the peripheral part at the wide end plane where the light volume is basically small. Thus aberration is eliminated at the central part of the picture frame, and no change in the light volume at the periphery of the picture, by the zooming operation, will be effected.

3 Claims, 9 Drawing Figures

WIDE END

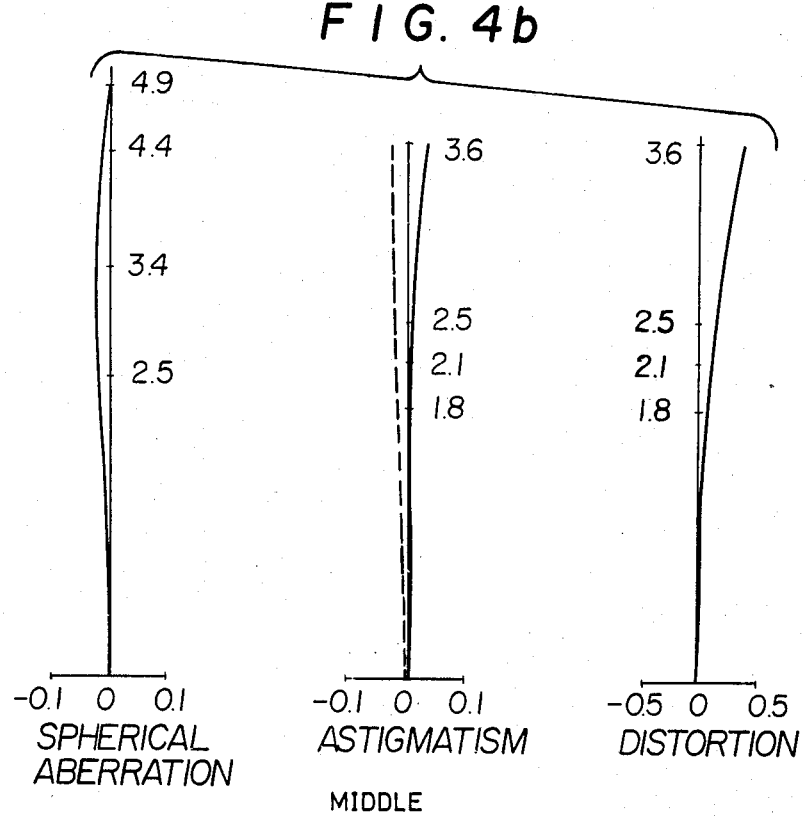
FIG. 4b MIDDLE
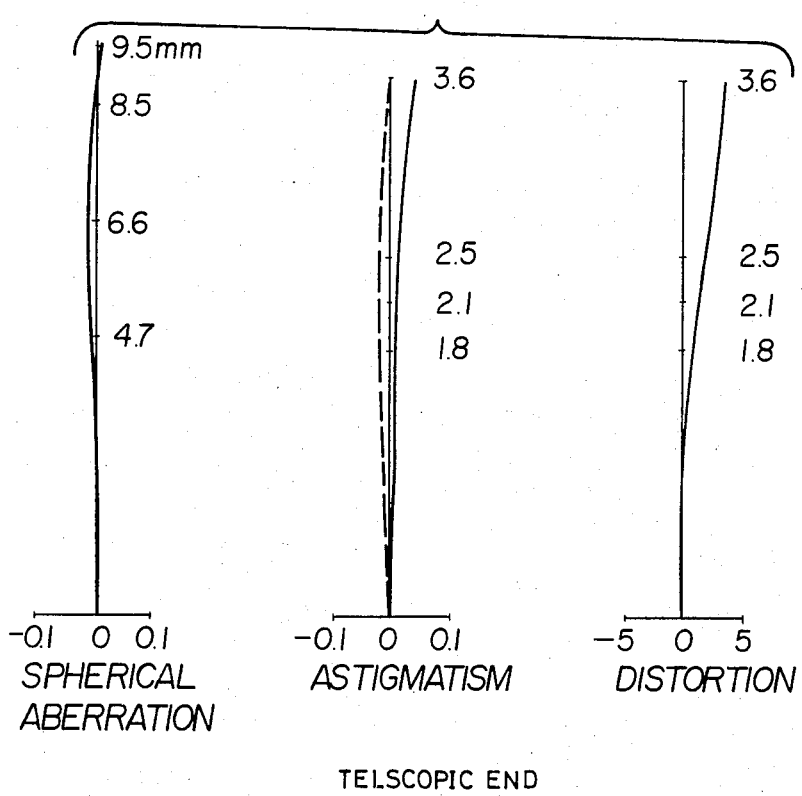
FIG. 4c TELSCOPIC END

WIDE END

MIDDLE

TELSCOPIC END

ZOOM LENS HAVING TWO DIAPHRAGMS

FIELD AND BACKGROUND OF THE INVENTION

The present invention relates to a zoom lens having little aberration at the center part of a picture and having no variation in the light volume at the periphery of a picture due to a zooming operation.

A conventional zoom lens will generally have variation in vignetting in a zooming operation. This variation in the aperture eclipse will take place largely at the center part of a picture. Therefore, in a conventional zoom lens there is generally a large variation in the light amount at the center part of a picture by zooming aperation.

This is caused by a the fact that while the total length of a zoom lens does not change during zooming operation, the focal distance changes, that is, it becomes such an optical system at the wide end that the total length of the lens becomes longer relative to the focal distance obtainable at the wide end.

That is, in a zoom lens the light flux at the center part of a picture substantially can not be controlled at the middle position and the wide end as compared to that at the telescopic end. Therefore the light volume at the center part of a picture is unnecessarily great, thus deteriorating the properties of the optical system and an unpleasant pattern of variation in the light volume becomes conspicuous along with the zooming.

However, by properly selecting the effective aperture of the variator lens, the light volumes at peripheral parts of the pictures at the wide end and at the telescopic end can be made equal.

That is, the effective aperture of the variator is so selected that the eclipse becomes large as the variator is moved toward the wide end, and the peripheral light volume at the wide end may be decreased.

However, even if the effective aperture of the variator lens is so selected as mentioned above, it only serves that the light amounts at the peripheral parts of picture at the wide end and at the telescopic end are made equal, and the difference in the light volume at the center part of a picture still remains large. Also, even if the effective aperture of the variator lens is so selected mentioned above the difference in light volumes at the central place (herein after called as the medium position) between the wide end and the telescopic end and at the telescopic end is large at the center part of picture and at the peripheral part. The reason therefor is that, since the effective aperture of the variator lens is so selected that the light volume becomes equal to the peripheral light volume of a picture at the telescopic end when the variator lens is moved toward the wide end, the variator lens will not have a an effective eclipse at the middle position.

Also it is possible to so select the effective aperture of the variator lens that the light volumes at the central part of a picture at the telescopic end and at the wide end are eqaul. However, in this case the eclipse by the variator lens becomes too big and the light volume at the peripheral part of a picture becomes too small as compared with the peripheral light volume of a picture at the telescopic end. In some cases the light volume becomes zero. Thus, even taking such measures as mentioned above the difference in the light volume of a picture is large at the telescopic end and at the wide end.

Also when the effective aperture of the variator lens is so selected that the light volume at the time when the variator lens is at the middle position is equal to the light volume of a picture at the telescopic end, the eclipse by the variator lens becomes too large as the variator lens is moved toward the wide end, and no light flux will reach the peripheral part of a picture at the wide end.

The difference in the light volume of a picture at the telescopic end, middle position and wide end, particularly in the light volumes at the center part of a picture and at the peripheral part of a picture, constitutes disadvantages for zooming.

Also it has such disadvantages in a television camera that even if the peripheral light volume itself can be compensated by a shading correction circuit, since the latitude of a television image pick up tube is small as compared with that of film-photo-sensitive material and since television photographing is done continuously in zooming, the variation in light volume along with the zooming will cause an unpleasant circle made by bright spots and dark spots which can be observed as moving along with zooming.

SUMMARY OF THE INVENTION

Therefore, the object of the present invention is to provide a zoom lens having little difference in light volume in each picture at the telescopic end, the middle position and the wide end, particularly the difference in the light volume at the center part of a picture and at the peripheral part of the same.

Also the object is the elimination of the deterioration in the optical properties which could not have been conventional eliminated and which is caused by the fact that the quantity of light entering at the wide end to the middle position is unnecessarily large.

Also, this phenomenon becomes more apparent as the focal distance range of the zoom lens is shifted toward the wide end. Thus one of the objects of the present invention is to obtain such a wide angle zoom lens as can not be obtainable hitherto.

In order to achieve these objects, the zoom lens of the present invention has a second diaphragm device, beside the diaphragm device to determine the F-number, which moves in the same direction as, and with a predetermined relationship with the movement of, the variator lens along the optical axis.

As the second diaphragm device is moved in a certain relationship with the variator lens, the amount of eclipse will be different depending on the position of the variator lens. The second diaphragm device moves in such a manner that the amount of the eclipse will be equal to the light volume of a picture at the telescopic end, that is, it is almost equal to the vignetting — image height curve at the telescopic end.

Thus the zoom lens of the present invention is one having little difference in the light volume in each of the pictures at the telescopic end, the middle position, and at the wide end.

Also the zoom lens of the present invention has little aberration as the incident light flux reaching the center part of a picture is vignetted by the second diaphragm device.

For an understanding of the principles of the invention, reference is made to the following description of a typical embodiment thereof as illustrated in the accompanying drawings.

BRIEF DESCRIPTION OF THE DRAWINGS

In the Drawings:

FIGS. 4a, 4b, and 4c are diagrams graphically showing each of the spherical aberrations, astigmatisms, and distortion aberrations, at the wide end (FIG. 4-a), the middle position (FIG. 4-b) and the telescopic end (FIG. 4-c) of the zoom lens shown in FIG. 2.

DESCRIPTION OF THE PREFERRED EMBODIMENT

Figure 1:
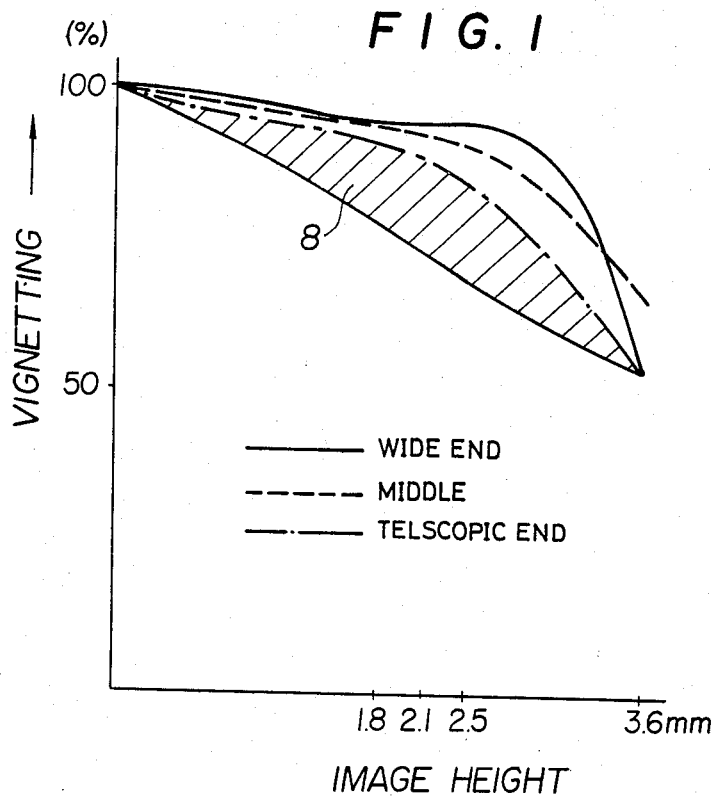
FIG. 1 is a diagram graphically showing the relationship between the image height and the vignetting in a conventional zoom lens.

FIG. 1 is a diagram showing the relationship between the image height and the vignetting of a conventional zoom lens. This zoom lens is so designed that the light volume at the wide end becomes equal to that at the telescopic end at the periphery of a picture (image height : 3.6mm). As apparent from this drawing, at the area where the image height is smaller than about 1.8mm, that is at the center part of a picture, the difference in the vignetting, that is, the light volume is small at the wide end, the middle position, and the telescopic end. But as the image height is increased, the difference becomes larger, although the difference between the telescopic end and the wide end becomes zero at the image height of 3.6mm.

Therefore when zooming is done the such a zoom lens the variation in the light volume is large at the periphery of a picture.

Figure 2:
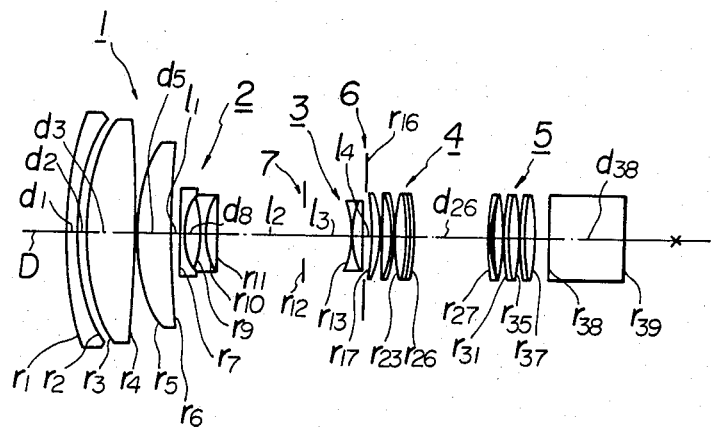
FIG. 2 illustrates an example of the zoom lens of the present invention.

In the zoom lens of the present invention shown in FIG. 2 the variation in the light volume is small. Now, the present invention will be explained with reference to FIGS. 2, 3, 4 and 5. 1 is a focusing lens. This lens has a refractive power as a whole and is not moved during zooming. 2 is a variator lens having diverging characteristics as a whole. This lens 2 is moved along an optical axis D by a zooming operation. 3 is a compensator lens. This lens 3 is moved along the optical axis D as the variator lens 2 is moved. 4 is a front part of a relay lens. 5 is a rear part of the relay lens. 6 is a first diaphragm device to determine the F-number. 7 is a second diaphragm device. This second diaphragm device 7 is positioned between the variator 2 and the first diaphragm device 6. The diaphragm device 7 is moved in the same direction as the moving direction of the variator lens 2 along the optical axis D, with a certain relationship with the movement of the variator lens 2. This second diaphragm device does not have to be moved in linear correspondence with the amount of movement of the variator lens 2, nor does it have to be continuously moved. Also the aperture of this second diaphragm device should not affect the first diaphragm 6. If not, the condition for having a constant F-value can not be secured when zooming is done and is not desirable. Further the aperture of this second diaphragm device 7 can be of a type capable of being varied along with the movement of diaphragm device 7. As a conclusion the amount of movement, mode of movement and aperture, etc. of this second diaphragm device are designed in such a manner that the curve showing the relationship between the image height and the vignetting is kept about constant. Such design is made taking into consideration the characteristics of other elements of the zoom lens and desired properties therefor. This second diaphragm device may be coupled with a means to move the variator lens, or may be provided independently with a moving means. But, it is desirable to move the same by providing a cam groove in the housing of the lens.

Figure 3:
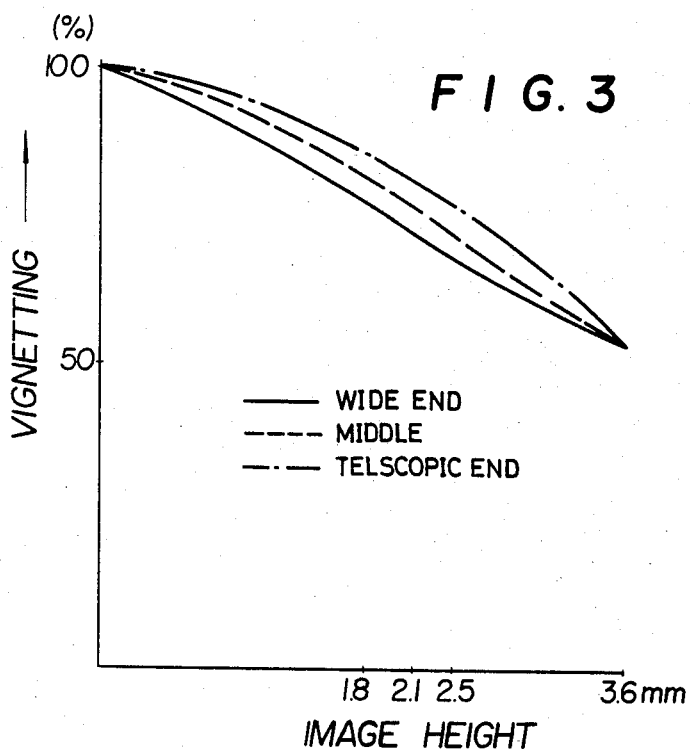
FIG. 3 is a diagram graphically showing the relationship between the image height and the aperture eclipse in the zoom lens shown in FIG. 2.

FIG. 3 shows the relationship between the vignetting and the image height of the zoom lens shown in FIG. 2. As apparent from this drawing, the image height-vignetting curve forms an almost straight line at the telescopic end. That is, the second diaphragm device 7 is so designed that the light is vignetted at the oblique lined zone 8 shown in FIG. 1. This is done to make the electrical shading correction easy. By this linearization, a disadvantage due to the lowering of the light volume is anticipated, but since the main light beam does not form a large angle with the optical axis at the back focus part, that is, being close to a telecentric optical system, reduction in the light volume by the $cos^4 Q$ rule is small, so that it is satisfactory for practical use.

Also as apparent from FIG. 3, the relative curve at the wide end and at the middle position is almost equal to the curve at the telescopic end. Therefore when zooming is done the variation in the peripheral light volume will not be large.

Figure 4A:
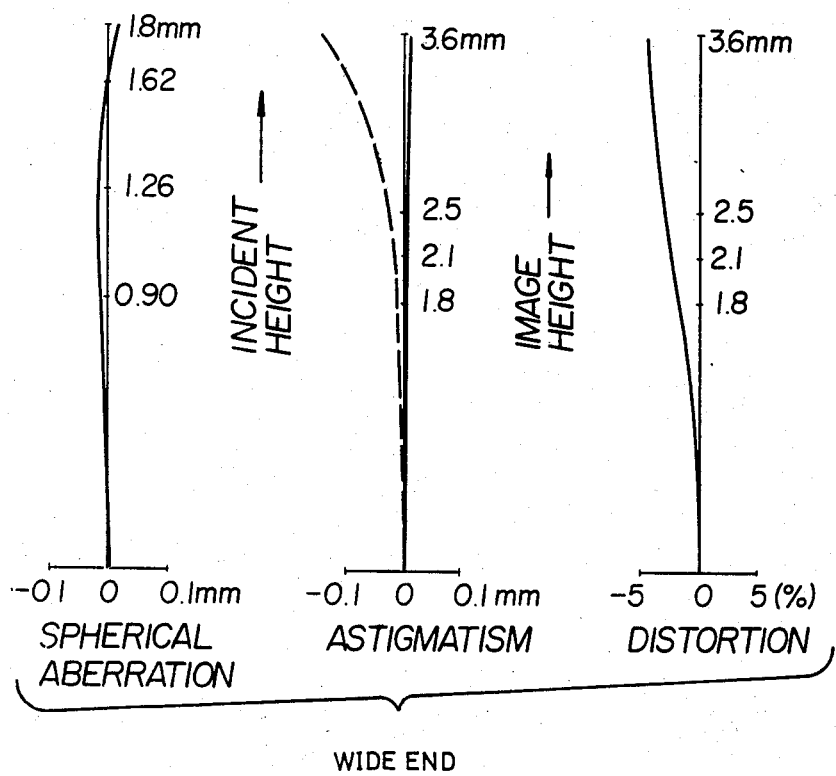
Figure 5A:
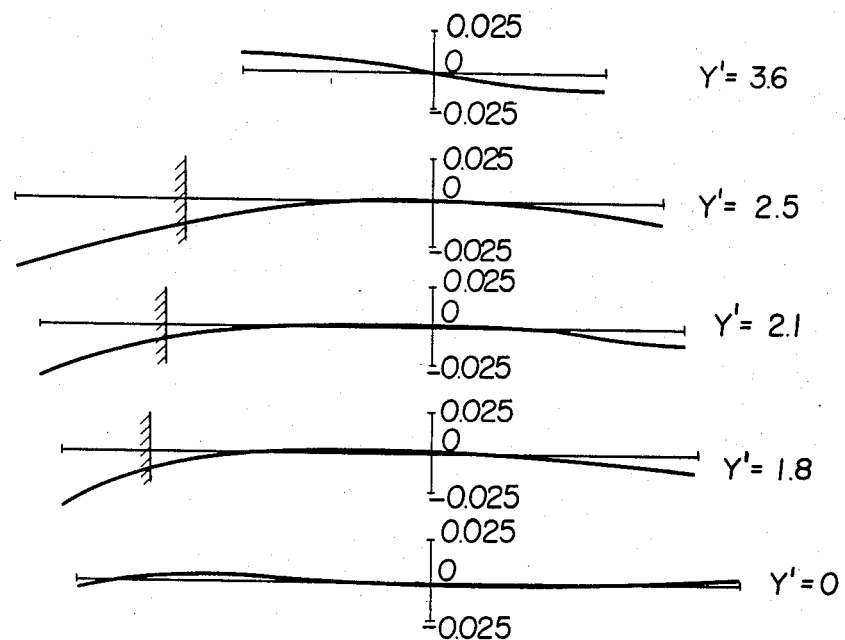
FIGS. 5a, 5b, and 5c are diagrams graphically showing each of the lateral aberrations at the wide end, the middle position and at telescopic end, respectively of the zoom lens shown in FIG. 2.
Figure 5B:
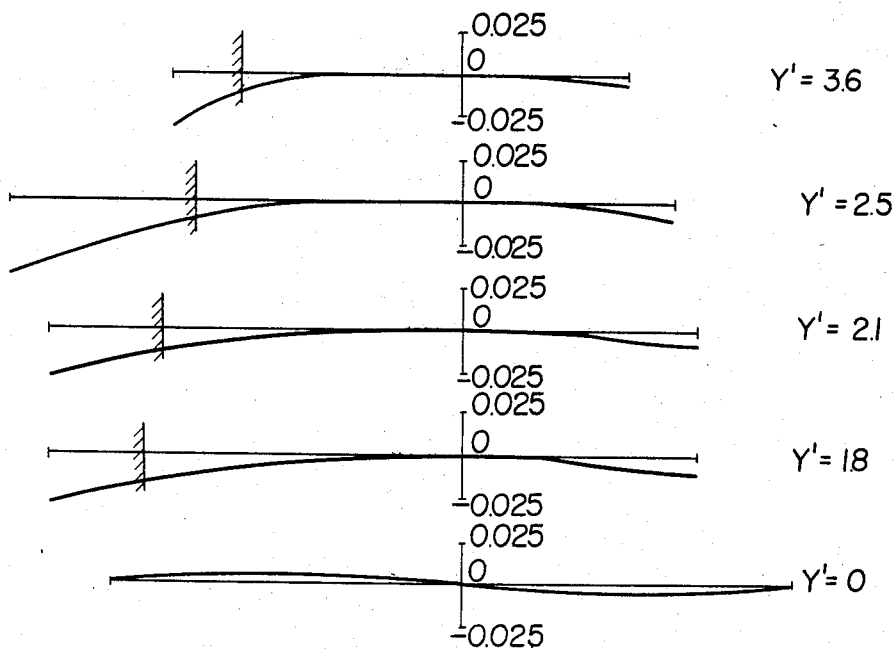
Figure 5C:
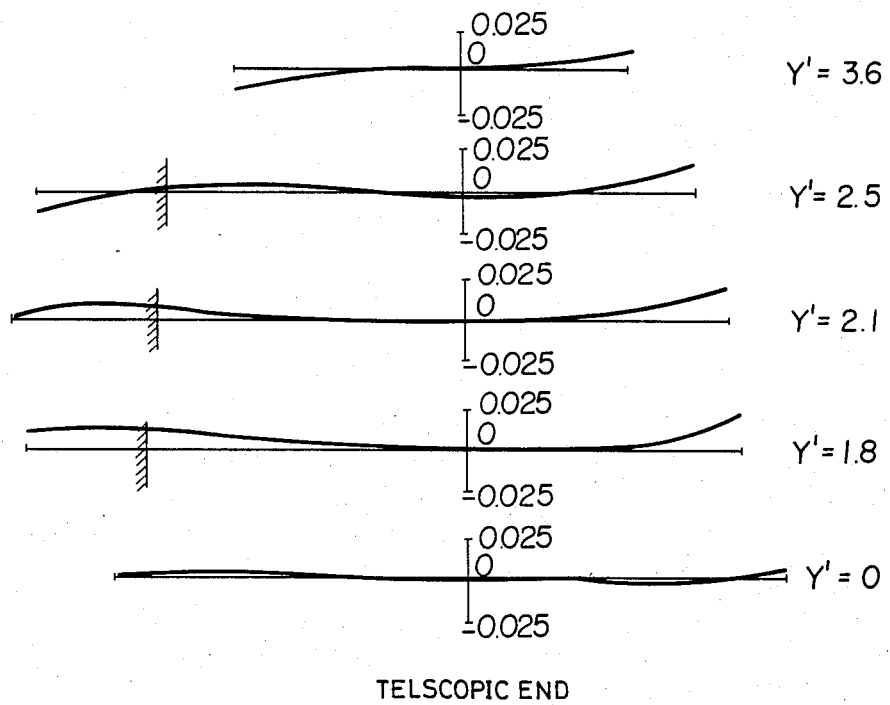

FIG. 4 shows the spherical aberration, astigmatism, and distortion aberration of the zoom lens shown in FIG. 2. The lateral aberration of the zoom lens of FIG. 2 is also shown in FIG. 5. From this graph of the lateral aberration it is known that the zoom lens of the present invention has little aberration.

In this lateral aberration graph the axis of abscissa shows the height above the axis of the light beam which crosses the perpendicular to the first plane using as a reference the height of the main light beam of the picture angle, that is, the line which crosses the optical axis at the position of aperture diaphragm to determine the F-number. The reason for the aberration becoming worse is that as the normal characteristic os such a of is such that its diaphragm is biased to the rear part of the lens assembly compared to the overall lens system, as apparent from the drawing, the width of the light flux up to the line lower than the main light beam is greater than that of the light flux above the axis, by the coma of the diaphragm. Therefore by using the second diaphragm 7 of the present invention the light beam below the lower line side lower than the light beam, which is shown in FIG. 1 with oblique lines, is cut off, and the width from the main light beam to the upper line becomes almost equal to the width from the main light beam to the lower line, so that the symmetry is remarkably increased.

Thus the properties at the wide end and at the middle part during zooming are remarkably enhanced in the zoom lens of the present invention. At the point of image height of 2.5mm at the middle part of zooming, the lateral aberration is reduced from its maximum of 0.048mm down to 0.015mm. Thus it has such a high performance that the lateral aberration surely falls in the zone of less than ±0.025mm. So the zoom lens of the present invention will have its light volume of a picture unchanged during zooming, especially at the center part and at the periphery, and at the same time it will have a wide angle at the wide end with its total lens length being held relatively short yet having its aberrations satisfactorily corrected in spite of its large aperture.

Next a table for the data and the tertiary aberration coefficient of the zoom lens shown in FIG. 2 will be shown below:

Focal distance: 6.675-18.126-38.477

Relative aperture: 1 : 1.85

| No. | r | d | N | $\nu$ |
|---|---|---|---|---|
| 1 | 59.75000 | | | |
| 2 | 35.6000 | 1.30000 | 1.92286 | 21.3 |
| 3 | 38.1700 | 1.95000 | | |
| 4 | −230.97000 | 8.50000 | 1.61800 | 63.4 |
| 5 | 28.73552 | 0.13000 | | |
| 6 | 124.93000 | 5.65000 | 1.61800 | 63.4 |
| 7 | 292.74000 | $l_1$ | | |
| 8 | 10.73000 | 0.50000 | 1.88300 | 41.0 |
| 9 | −19.93751 | 2.90000 | | |
| 10 | 11.90000 | 0.60000 | 1.78650 | 50.2 |
| 11 | 246.32000 | 2.10000 | 1.92286 | 21.3 |
| 12 | ∞ | $l_2$ | | |
| 13 | −20.98952 | $l_3$ | | |
| 14 | 16.41000 | 0.50000 | 1.80610 | 40.8 |
| 15 | ∞ | 1.60000 | 1.80518 | 25.4 |
| 16 | ∞ | $l_4$ | | |
| 17 | −57.13000 | 1.00000 | | |
| 18 | −20.12000 | 1.30000 | 1.62041 | 60.3 |
| 19 | 134.00000 | 0.10000 | | |
| 20 | −25.02000 | 1.70000 | 1.62041 | 60.3 |
| 21 | −15.25000 | 0.53000 | | |
| 22 | −19.50000 | 0.50000 | 1.80518 | 25.4 |
| 23 | 32.06353 | 0.10000 | | |
| 24 | −67.73000 | 1.80000 | 1.62041 | 60.3 |
| 25 | −26.55000 | 0.50000 | | |
| 26 | −42.23000 | 0.50000 | 1.80518 | 25.4 |
| 27 | 56.36000 | 13.42244 | | |
| 28 | 27.56000 | 0.50000 | 1.80518 | 25.4 |
| 29 | 174.60000 | 0.60000 | | |
| 30 | −34.81000 | 1.50000 | 1.71300 | 54.0 |
| 31 | 33.98000 | 0.13000 | | |
| 32 | 21.07000 | 0.50000 | 1.80518 | 25.4 |
| 33 | 28.06475 | 0.23000 | | |
| 34 | −86.88000 | 1.70000 | 1.71300 | 54.0 |
| 35 | 115.52000 | 0.13000 | | |

-continued

| No. | r | d | N | $\nu$ |
|---|---|---|---|---|
| 36 | 38.69000 | 0.50000 | 1.80518 | 25.4 |
| 37 | −83.67000 | 1.70000 | 1.71300 | 54.0 |
| 38 | ∞ | 2.60000 | | |
| 39 | ∞ | 13.00000 | 1.51633 | 64.1 |

| | wide end | middle | telescopic end |
|---|---|---|---|
| $l_1$ | 0.886156 | 13.915757 | 19.934757 |
| $l_2$ | 9.77167 | 0.266963 | 0.397002 |
| $l_3$ | 12.34960 | 6.297661 | 0.847105 |
| $l_4$ | 0.75989 | 3.287400 | 2.588871 |
| Tertiary Aberration Coefficient | wide end | middle | telescopic end |
| Spherical Aberration | 0.27492 | 0.31953 | 0.18179 |
| Coma | 0.19433 | 0.18701 | −0.11793 |
| Astigmatism | 0.02400 | 0.03139 | 0.03318 |
| Petzval Sum | −0.0403 | −0.04303 | −0.04303 |
| Distortion | 0.40807 | −0.18978 | 0.23701 |

What is claimed is:

1. A zoom lens comprising, in combination, a focusing lens; a variator lens moving, during a zooming operation, in the direction of the optical axis of said zoom lens; a compensator lens moving, during a zooming operation, in the direction of said optical axis; a relay lens; a first diaphragm device positioned between said compensator lens and said relay lens to determine the F-number; and a second diaphragm device positioned between said variator lens and said first diaphragm device, said second diaphragm device being movable along said optical axis in the same direction as movement of said variator lens and with a predetermined relationship with the movement of said variator lens.

2. A zoom lens as claimed in claim 1, in which said second diaphragm device is positioned between said variator lens and said compensator lens.

3. A zoom lens, as claimed in claim 1, in which said second diaphragm device is a diaphragm having an aperture adjustable in accordance with movement thereof along said optical axis.

* * * * *